United States Patent

Nagel et al.

[11] 4,213,422
[45] Jul. 22, 1980

[54] GRATED FLOOR CONVEYOR FOR POULTRY ENCLOSURE

[75] Inventors: Hans J. Nagel, Contrescarpe 72, D-2800 Bremen, Fed. Rep. of Germany; Egon Schumacher, Barnstorf, Fed. Rep. of Germany

[73] Assignee: Hans J. Nagel, Bremen, Fed. Rep. of Germany

[21] Appl. No.: 928,497

[22] Filed: Jul. 27, 1978

[51] Int. Cl.² ............................................. A01K 31/04
[52] U.S. Cl. ....................................... 119/21; 119/22; 198/850
[58] Field of Search ....................... 119/21, 22, 16, 17, 119/18, 12, 82; 198/850, 851

[56] References Cited

U.S. PATENT DOCUMENTS

| | | | |
|---|---|---|---|
| 2,270,858 | 1/1942 | Gallamore | 198/851 |
| 2,604,874 | 7/1952 | Forbes et al. | 119/21 |
| 2,856,897 | 10/1958 | Galinsky et al. | 119/22 |
| 3,915,025 | 10/1975 | Poerink | 198/850 |
| 3,916,835 | 11/1975 | Reynolds | 119/82 |
| 4,148,276 | 4/1979 | Schmidt | 119/21 |

FOREIGN PATENT DOCUMENTS 2413390  9/1975  Fed. Rep. of Germany ............. 119/22

*Primary Examiner*—Jay N. Eskovitz
*Attorney, Agent, or Firm*—Sughrue, Rothwell, Mion, Zinn and Macpeak

[57] ABSTRACT

The elevated upper floor 11 of a poultry fattening enclosure comprises a plurality of adjacent endless belts 15a, 15b, etc. movable in unison toward a transverse cross-conveyor 17 at one end of the enclosure to facilitate the removal of the birds. Each belt comprises a plurality of I-shaped double bushings 29 journalled at their ends to cross rods 30 to form a flexible floor grate, which engages sprocket-like rollers 20 at both ends of the run. The lower belt runs may comprise only drive cables 38 to save material and enable the free dropping of excrement to the lower enclosure floor 10. Alternatively, the floor 11 may comprise a series of rectangular frames 41 in which grates or mats 42 are clamped, the frames being connected by withdrawal cables 43 which pull them through slots 47 in an end wall 48 of the enclosure.

9 Claims, 8 Drawing Figures

GRATED FLOOR CONVEYOR FOR POULTRY ENCLOSURE

BACKGROUND OF THE INVENTION

This invention relates to a grated floor conveyor arrangement for keeping and removing small animals, particularly fattened poultry such as chickens, from a housing enclosure.

While egg laying hens are mostly housed in stationary batteries of cages, in poultry breeding it is common to keep the animals in large area enclosures on an open, grate-like floor. This floor is often arranged at a distance over the fixed floor or bed of the enclosure. The grate-like floor openings enable excrements and other impurities to fall through onto the fixed floor of the enclosure, where they may be easily removed.

A problem with this flooring arrangement is removing the poultry from the enclosure after fattening. During the growth or fattening phase the animals are largely inactive, and are especially reluctant to leave the enclosure under their own power.

SUMMARY OF THE INVENTION

An object of this invention is thus to provide a floor arrangement to implement the removal of fattened chickens or broilers from a housing enclosure. To achieve this objective the floor is formed as a grated conveyor and is entirely or partially movable in its horizontal plane. The grate-like floor is moved as a transport device, with the animals sitting or standing thereon, to the edge of the enclosure, where the animals are transferred for removal to a cross conveyor which runs transverse to the delivery direction of the floor. This cross conveyor then transports the animals out of the enclosure.

This conveying movement of the floor over the entire width of the enclosure enables all animals to be safely transported away within a relatively short period of time. For safety reasons a catch grate can be arranged on one end of the floor across the direction of transport to prevent the animals from leaving or escaping from the moving floor.

The floor is preferably formed as an endless, rotating conveyor element consisting of a pluraltiy of adjacent belts which are moved together. Diverting or reversing rollers are provided at both ends of the belts, one of which is driven by a motor. Each belt is composed of individual members which together form a flexible grate, which meshes with the diverting rollers in a sprocket-like manner.

Alternatively, the floor may be comprised of individual, plate-like floor elements connected to each other and moved during discharge transport through a slit-like opening in an end wall of the enclosure on the delivery side for the animals.

DETAILED DESCRIPTION OF THE PREFERRED EMBODIMENTS

Figure 1:
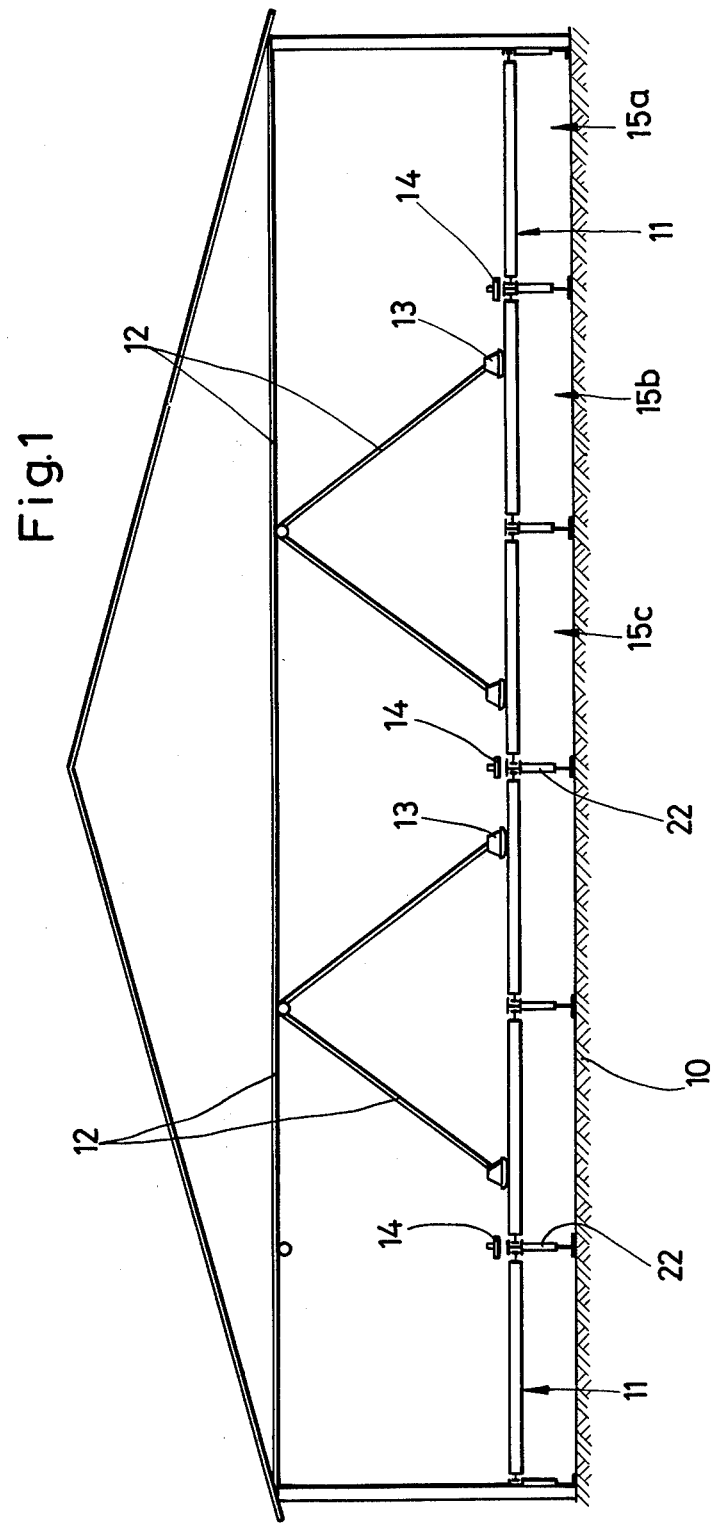
FIG. 1 is a cross section through a simplified enclosure formed according to the invention.

FIG. 1 shows a schematic cross section of an enclosure for holding, for example, young breeding chickens. An upper floor 11 is arranged inside the enclosure above and spaced from the main or lower floor 10. This floor 11 forms the walking or standing surface for the animals. A system of pipes 12 for supplying feeding devices 13 is provided above the floor 11, and watering devices 14 are also arranged above the floor.

Figure 2:
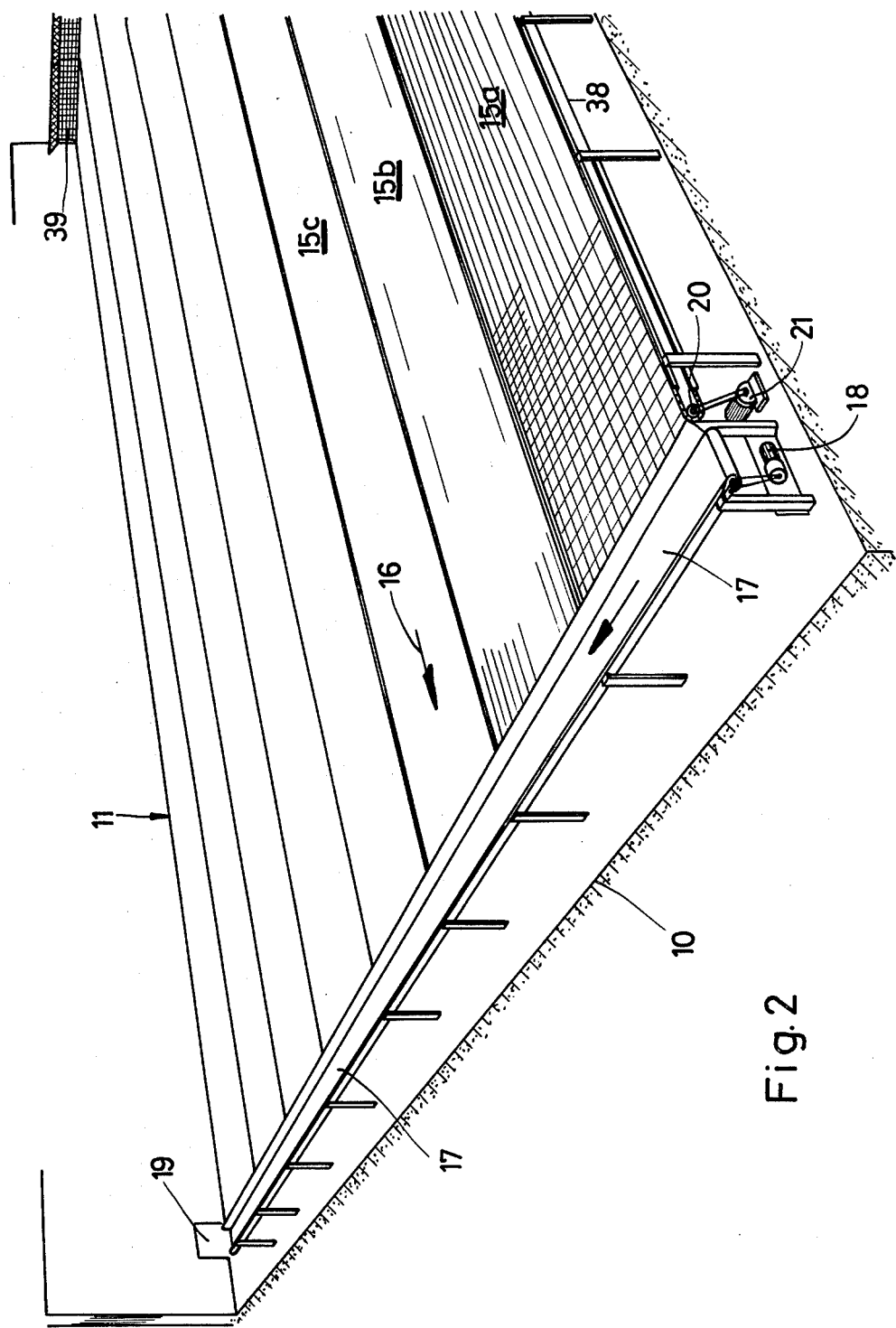
FIG. 2 is a perspective view of a floor section according to the invention.

The entire floor 11 is formed as a conveyor for the animals, whereby it is movable over the full width of the enclosure in the plane of the floor. For this purpose the floor 11 is divided into individual belts 15a, 15b, 15c, etc. These belts are movable in unison in the direction of arrow 16 in FIG. 2.

The transport movement of the belts 15a, 15b, etc. runs toward a cross conveyor 17, which is arranged at the edge of the enclosure. The animals are moved by the floor 11 onto the cross conveyor, which is arranged somewhat lower than the floor 11 for this purpose. The cross conveyor is driven by a motor 18 in a direction transverse to the delivery direction of arrow 16. The animals are transported out through an opening 19 in the wall of the enclosure.

In the embodiment of FIGS. 2 through 6 the floor belts 15a, 15b, etc. are formed as flexible or deformable endless conveyor belts, which run over diverting rollers at their ends. The divering roller 20 facing the cross conveyor 17 also serves as the drive roller for the belts 15a, 15b, etc., and is driven by a motor 21 via a chain or belt.

Figure 3:
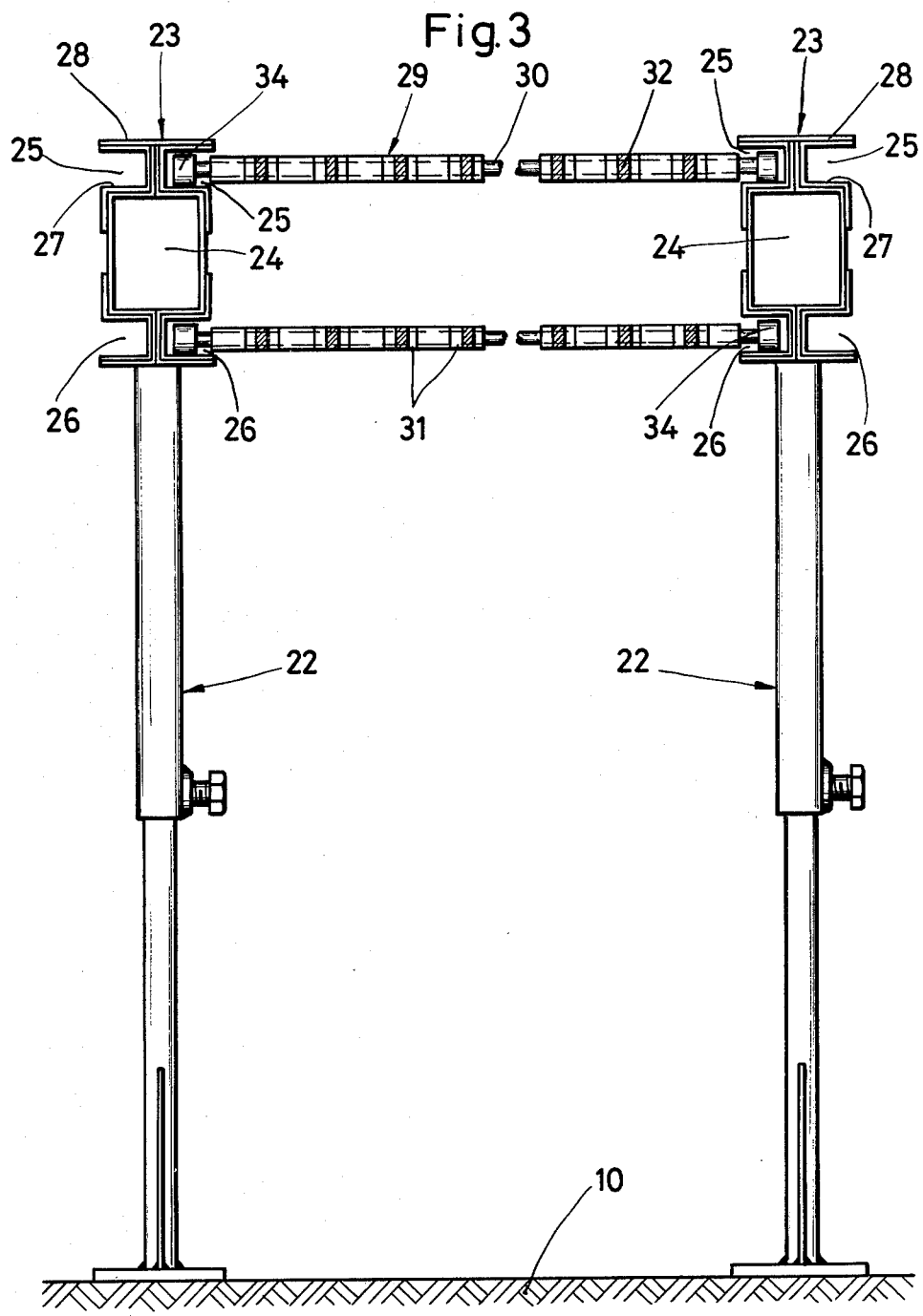
FIG. 3 is a cross section through a portion of the floor in an enlarged scale.
Figure 4:
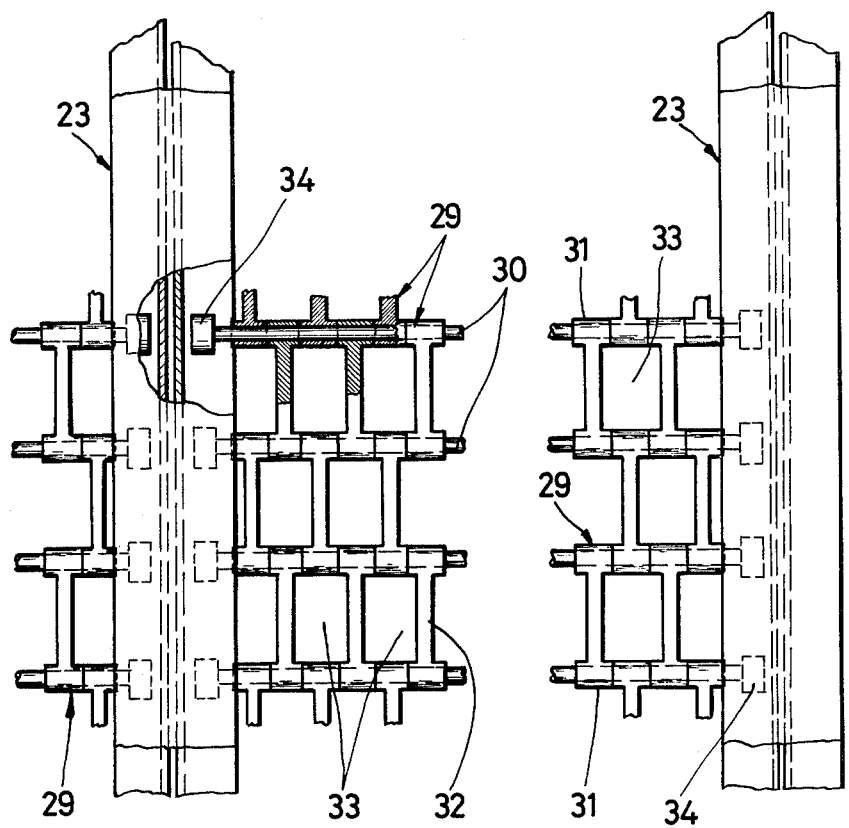
FIG. 4 is a plan view of a floor section.

The floor belts are mounted on height-adjustable, telescoping supports 22 which rest on the floor 10 of the enclosure. Support sections 23, which run in the direction of movement of the belts, lie at the upper ends of the supports 22. These support sections comprise, as shown in FIG. 3, continuous hollow box beams 24. Two U-shaped guide rails 25, 26 are respectively arranged on the upper and lower sides thereof, and their open sides face the associated floor belt 15a, 15b, etc. The upper sides of the belts enter the upper guide rails 25 and ride on the lower flanges 27 thereof. A continuous upper flange 28 covers the space between adjacent belts 15a, 15b, etc.

The belts 15a, 15b, etc. comprise longitudinal elements 29 pivotally mounted on cross rods 30 which run transverse to the direction of delivery. The elements 29 are double-T or I-shaped and have wide hollow end bosses 31 joined by narrow connecting members 32 which extend in the direction of transport. Rectangular or quadratic openings 33 are thus formed for the passage of excrement and the like. The elements 29 may be made of plastic or some other suitable corrosion resistant material having sufficient tensile strength. For example, the openings 33 may have a length of 25 mm and a width of 18 mm, and the diameter of each cross rod 30 may be about 10 mm.

The ends of the cross rods 30 pass into the guide rails 25, and are provided with a roller 34 on each end. Alternatively, the cross rod ends may be provided with castors.

Figure 5:
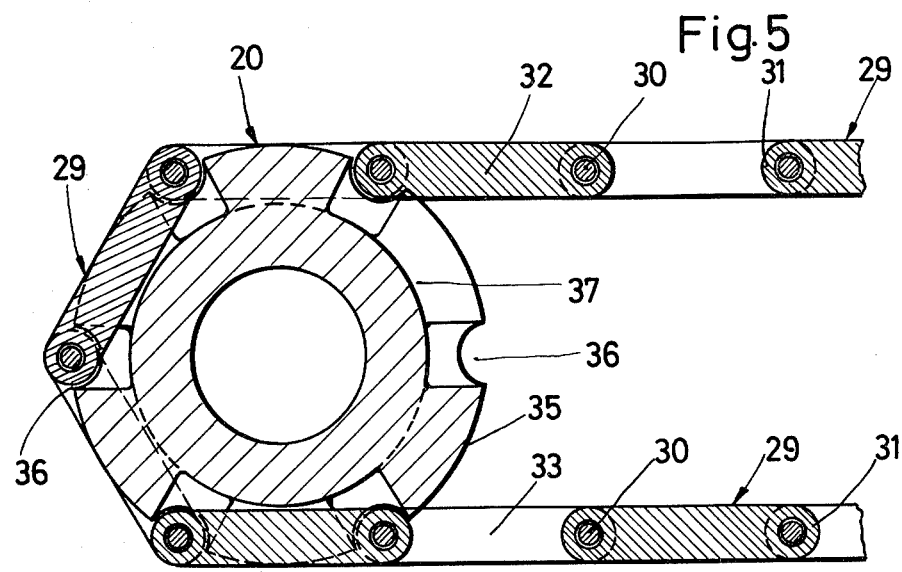
FIG. 5 is a cross section through the diverting portion of the floor showing a diverting roller.
Figure 6:
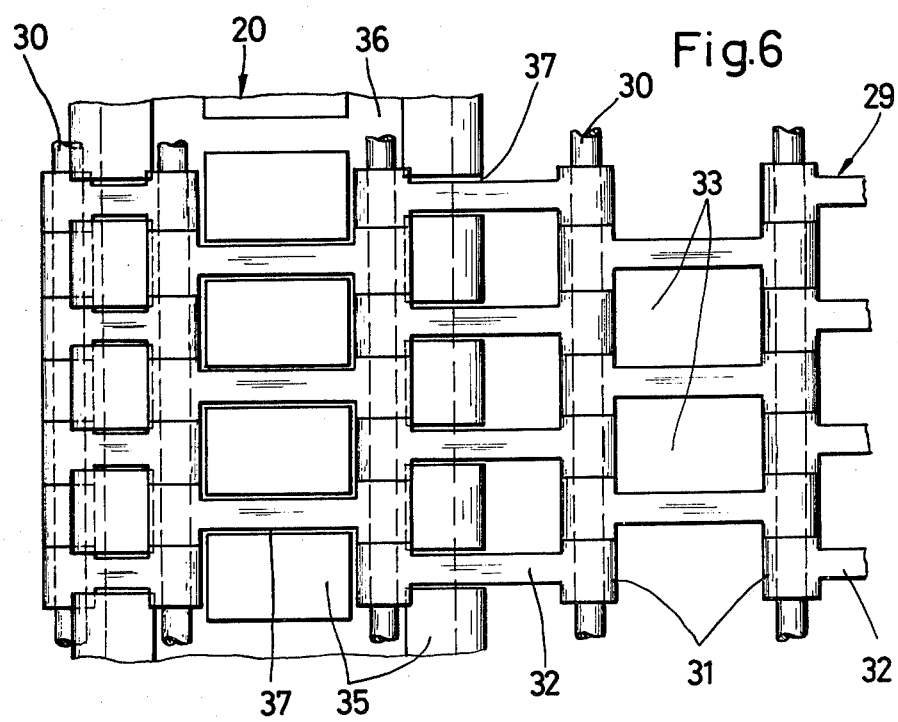
FIG. 6 is a plan view of the diverting roller according to FIG. 5.

The rotatable mounting of the elements 29 on the cross rods 30 enables the belts 15a, 15b, etc. to be guided around the diverting rollers 20, which are suitably shaped to grippingly engage the belts in a sprocket-like manner. As seen in FIGS. 5 and 6, ridges 35 are formed on the periphery of the diverting roller 20 which fit into the recesses 33, and axial grooves 36 between the ridges receive the cross rods 30. Circumferential grooves 37 are also provided to accommodate the cross members 32 of the elements 29.

The belts 15a, 15b, etc. are formed in a screen-like manner so that only the upper side serves as a floor 11 for the animals. The lower side consists only of return run cables 38 which are joined to the upper sides of the belts near the guide rails 25 or 26 by simple connections with one or more cross rods 30. This "half belt" construction reduces the material expense and enables the floor 10 to be substantially free during the transport movement of the floor 11 so that cleaning operations can be performed.

The belts 15a, 15b, etc. may alternatively be formed such that the driving forces are transferred only by side members, such as chains connected to the cross rods 30. No strong tensile elements are then needed between the cross rods 30, and a simpler and less expensive covering can be used, such as a perforated mat.

In order to prevent the animals from leaving the floor 11 at the end opposite the cross conveyor 17, a cross carrier device in the form of a catching grate 39 is provided on the floor. This catching grate travels with the floor almost to the cross conveyor 17.

Figure 7:
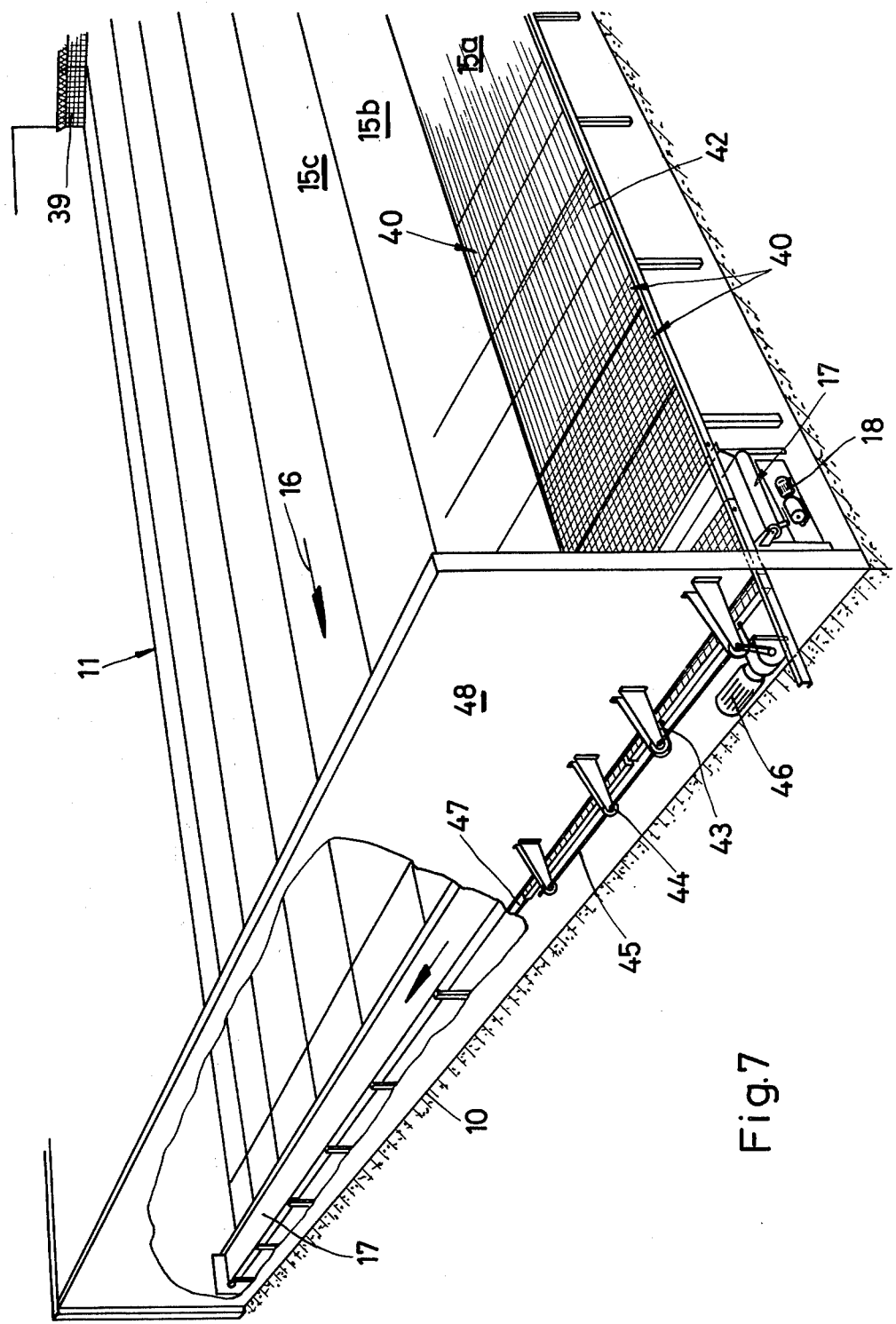
FIG. 7 is a perspective view of an embodiment of the invention having individual plate-like floor elements.
Figure 8:
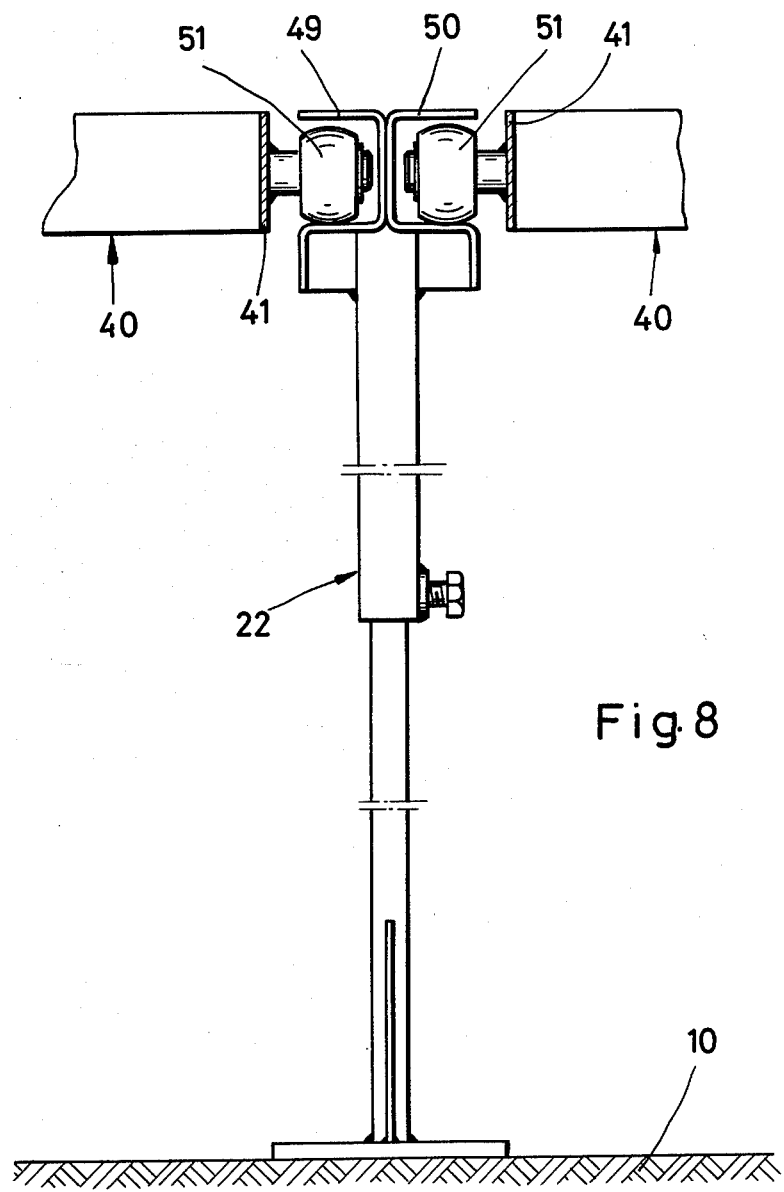
FIG. 8 is an enlarged cross section through the floor of the embodiment of FIG. 7.

An alternative embodiment is shown in FIGS. 7 and 8. Here individual, substantially rigid, plate-like floor elements 40 are successively arranged to form the belts 15a, 15b, etc. Each floor element 40 may consist of a closed frame 41 in which a grate 42, a perforated mat or the like is clamped.

The floor elements 40 are moved toward the cross conveyor 17 to remove the animals from the enclosure. For this purpose each floor element 40 can be coupled onto continuous drive cables 43. The cables 43 run over drive rollers 44 which are mounted on a common shaft 45 and driven by a motor 46.

The moving floor elements 40 successively pass through a slit-like opening 47 in an end wall 48 of the enclosure. The opening 47 has a vertical dimension such that the animals are held back in front of the wall 48 on the inside of the enclosure and thereby remain on the cross conveyor 17. The floor elements 40 which leave the enclosure in this manner are successively manually removed on the outside and then replaced after the enclosure has been emptied.

The floor elements 40 are guided in adjacent U-shaped guide rails 49, 50 on castors 51 attached to the frames 41.

What is claimed is:

1. In a housing enclosure for the breeding and fattening of poultry or the like and including means for feeding and watering the poultry and an upper floor for the poultry spaced above an underlying floor bed, the improvement comprising:
   (a) an upper floor formed as a series of endless, rotatable conveyor belts whose upper run serves as a floor for the animals, said upper floor being in the form of a grate and comprising a plurality of synchronously movable adjacent grate-like bands located substantially in a plane parallel to the floor bed, said grate-like bands comprising a plurality of pivotably mounted individual elements such that said bands are articulated;
   (b) support means comprising stationary guide rails extending between adjacent bands, said guide rails having an upper covering; and
   (c) a catching grate provided on the upper floor which is movable together with said upper floor for preventing the poultry from leaving the floor.

2. A housing enclosure according to claim 1, wherein the upper floor is movable toward a cross-conveyor which runs transverse to the direction of movement of the upper floor at one end thereof, whereby small animals transported by the floor are transferred to the cross-conveyor.

3. A housing enclosure according to claim 1, wherein each element comprises an I-shaped member having bushings at its broadened ends pivotably journalled on cross-rods which run transverse to the direction of delivery.

4. A housing enclosure according to claim 1, wherein the lower run of the belt comprises at least two spaced side-draw cables.

5. A housing enclosure according to claim 1, wherein the cross-rods are supported in laterally extending guide rails by roller members.

6. A housing enclosure according to claim 1, wherein the cross-rods are supported in laterally extending guide rails by slide members.

7. A housing enclosure according to claim 1, wherein laterally extending guide rails are mounted on vertically adjustable supports.

8. A housing enclosure according to claim 1, wherein the conveyor belts are guided over a rotating, driven diverting roller which is provided with sprocket-like ridges and depressions which engage the belts.

9. A housing enclosure according to claim 1, wherein the upper floor is provided with a catching grate which runs across the direction of movement and moves together with the upper floor.

* * * * *